Sept. 28, 1926.
H. W. A. DIXON ET AL
1,601,162
MACHINE FOR TESTING CARBON PAPER, TYPEWRITTER RIBBON, ETC
Filed May 15, 1924    2 Sheets-Sheet 1
Fig.1,
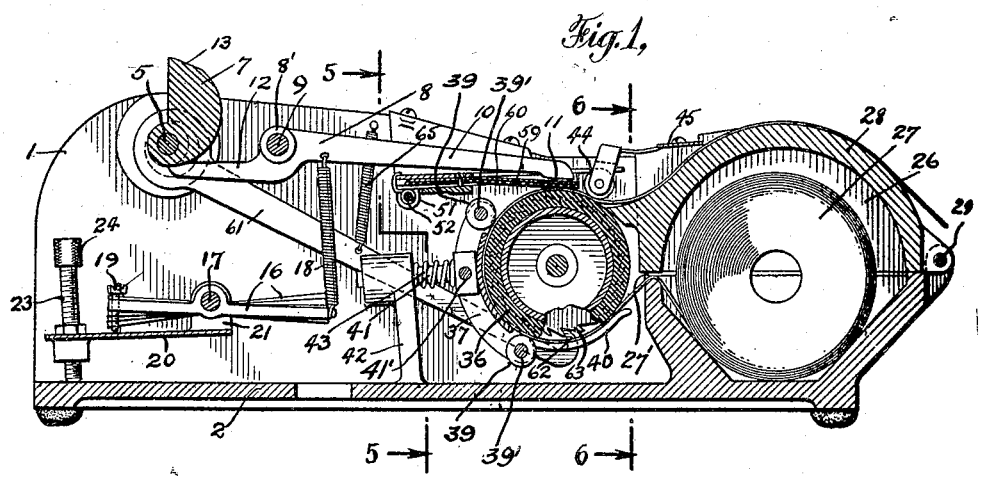
Fig.2
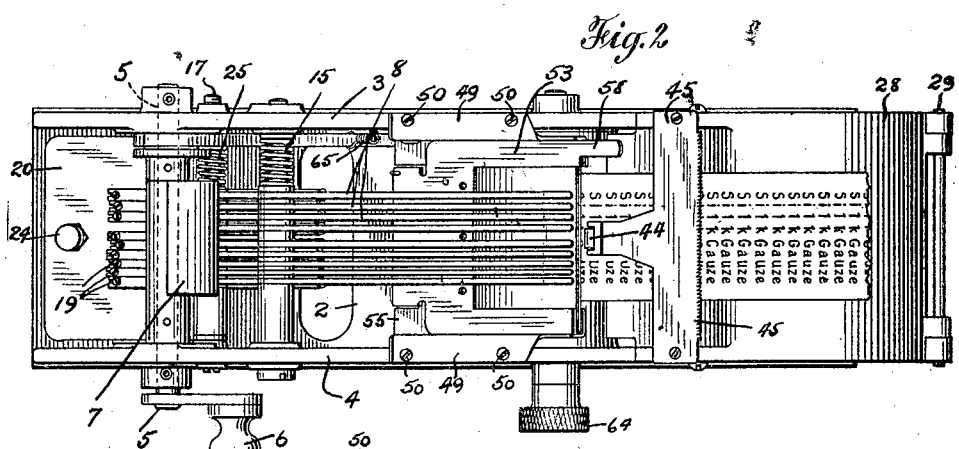
Fig.3,
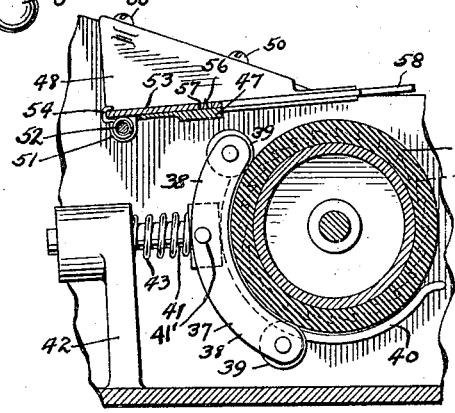
Inventors
HAROLD W. A. DIXON AND
LEWIS M. DIXON
By their Attorneys
Kiddle and Margeson Sept. 28, 1926.
H. W. A. DIXON ET AL
1,601,162
MACHINE FOR TESTING CARBON PAPER, TYPEWRITTER RIBBON, ETC
Filed May 15, 1924  2 Sheets-Sheet 2
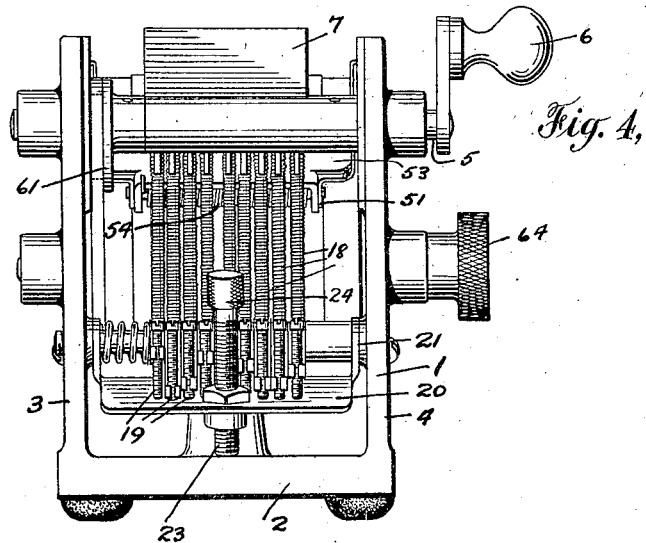
Fig. 4,
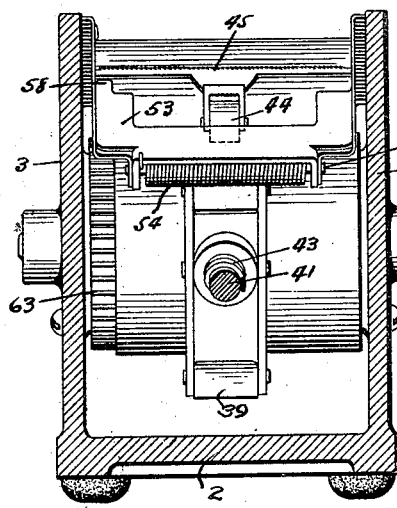
Fig. 5
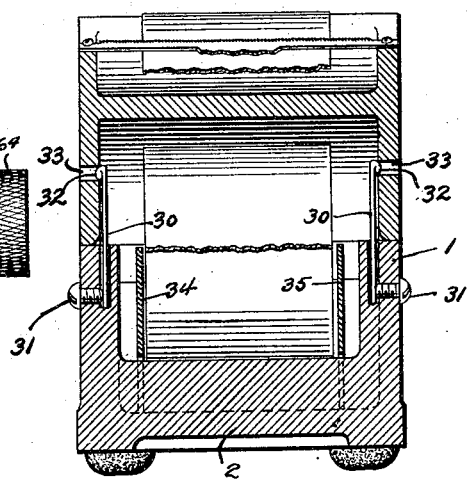
Fig. 6,
Inventors
HAROLD W. A. DIXON AND
LEWIS M. DIXON
By their Attorneys
Kiddle and Margeson Patented Sept. 28, 1926.

1,601,162

UNITED STATES PATENT OFFICE.

HAROLD W. A. DIXON, OF HOLLIS, NEW YORK, AND LEWIS M. DIXON, OF BLOOMFIELD, NEW JERSEY, ASSIGNORS TO COLUMBIA RIBBON AND CARBON MANUFACTURING CO., INC., OF NEW YORK, N. Y., A CORPORATION OF NEW YORK.

MACHINE FOR TESTING CARBON PAPER, TYPEWRITER RIBBON, ETC.

Application filed May 15, 1924. Serial No. 713,589.

Our invention relates to testing machines for testing carbon paper, typewriter ribbons, and the like, and is particularly adapted for making comparative tests as to the quality and durability of such materials.

One of the objects of our invention is the provision of a portable testing machine wherein the type bars are held against lateral movement and wherein the alinement of the type is maintained, to thereby ensure that the type will always strike the material being tested in the same place on each stroke.

Another object of our invention is the provision of an improved testing machine structure wherein the type bars are always under tension, this tension being adjustable with respect to all the bars as a unit and with respect to each individual bar.

Further objects are the provision of novel means for holding the material being tested, and the provision of a novel paper-containing chamber or compartment.

Further objects will appear hereinafter.

In the accompanying drawings,

Fig. 1 is a longitudinal sectional view of an embodiment of our invention;

Fig. 2 is a plan view thereof;

Fig. 3 is an enlarged view partly in section showing the means for holding the carbon paper in place to be tested and also the means for holding and guiding the paper around the platen;

Fig. 4 is a view of the rear end of the machine of Fig. 1;

Fig. 5 is a section on the line 5—5 of Fig. 1 looking in the direction of the arrows; and Fig. 6 is a section on the line 6—6 of Fig. 1 looking in the direction of the arrows.

Referring to the drawings in detail, 1 designates a casing which comprises a base 2 and side walls 3 and 4.

Extending transversely of the casing and having its bearings in the side walls thereof is a rotatable type-operating shaft 5, one end of which extends to the exterior of the casing and has an operating handle 6 affixed thereto. Within the casing and rigidly secured to the shaft 5 is a type bar operating cam 7.

Pivoted type bars 8 are provided within the casing 1 and extend longitudinally thereof, these bars lying in the same horizontal plane. A transverse type-bar supporting shaft 9 carries the type bars, and to space the bars from each other we provide washers 8'. The type bars are movable independently of each other about their supporting shaft. Each type bar comprises a forwardly extending portion or arm 10 provided with type 11 at its forward end, and a rearwardly extending arm 12 projecting beneath the shaft 5 and in the path of the cam 7. By this construction as the cam is rotated the type bars will be pivoted about their supporting shaft.

A dwell 13 is provided on the face of the cam 7 for the purpose of holding the type bars out of operative position, as will be brought out hereinafter.

Lateral movement and lost motion in the type bars is prevented by a spring 15 on the shaft 9.

Below the type bars is a series of tensioning members or levers or arms 16, an arm for each type bar. These tensioning levers or arms are pivotally mounted on a transverse shaft 17, which is parallel to the shaft 9. The levers are operatively connected to their respective type bars 8 by a spring 18. One end of the spring is connected to the forward end of the tensioning lever and the other end is connected to the forwardly extending portion 10 of the type bar for the purpose of causing the keys to strike the material to be tested after the type arms are disengaged by the type-operating cam 7.

The rear end of each tensioning lever is provided with an individual adjusting screw 19, the lower end of which engages a plate 20 which is pivotally mounted at one end on the tensioning lever supporting shaft 17, the shaft passing transversely of the plate through vertical side flanges 21 with which the plate is provided. The rear of the plate 20 receives a single adjusting screw 23 for adjusting the tension of all of the springs 18 simultaneously, whereby the force with which the type bars are operated may be varied. This screw is provided with a knurled knob 24 and when rotated in one direction will bear against the base 2 of the casing, causing the plate 20 to pivot upwardly about the shaft 17, carrying with it the screws 19, thereby causing said levers 16 to pivot about the same shaft 17 to increase the tension on the springs 18. By rotating the screw 23 in the opposite direction the plate 20 will be lowered and the tension on the type bars will be correspondingly decreased. Lateral movement of the tensioning levers 16 is conveniently prevented by a spring 25.

At the forward end of the machine we provide a paper-holding compartment 26 adapted to receive a roll of paper 27 upon which the impression is to be made. This compartment is provided with a cover 28, which is hinged or pivotally attached at 29 to the casing. This cover is adapted to be held in closed position by means of vertical spring pins 30 (Fig. 6) held in the casing at their lower ends by means of screws 31. The upper end of each pin is provided with a cam 32 adapted to engage an opening or depression 33 in the cover 28 to thereby maintain the cover closed.

The roll 27 lies in the bottom of the chamber 26 between the walls 34 and 35 thereof. The paper is led from the roll through a slot 27' provided between the edge of the cover 28 and the edge of the lower section of the paper compartment, from which it is passed about a platen 36, between the platen and a spring pressed guide 37. This guide comprises a curved guide arm 38 having guide rollers 39 pivoted on studs 39' at each end of its extremities contacting with the face of the platen. The lower end of this guide arm is provided with a guide lip 40 which may be integral therewith, and the paper passes between this lip and the platen as it leaves the paper compartment. The guide arm 38 is carried by a pin 41 to which it is pivoted by a pivot pin 41', the pin 41 having a bearing in a support 42 which may be integral with the base 2, a spring 43 which bears against the arm 38 pressing the guide rollers 39 carried by this arm against the platen.

The paper from the roll 27 passes about the under side of the platen and then between the platen and the guiding mechanism just referred to, after which it is doubled back upon itself to pass under a pressure roller 44 resiliently mounted on a transverse cutter 45 attached to the cover 28 of the paper compartment.

The holder for the carbon paper or ribbon to be tested comprises a base plate 47 (Fig. 3) substantially U shaped in plan and having vertical side flanges 48 and transverse flanges 49. The flanges 48 lie along the side walls 3 and 4 of the machine casing and the transverse or lateral flanges 49 extend over the top or edge of the casing side walls and are attached thereto by screws 50. This construction provides a base immediately above the platen 36 for the paper to be tested. The base plate 47 has downwardly projecting side flanges 51 adapted to receive and support a shaft 52, on which a clamp 53, also substantially U shaped in plan, is pivotally mounted. The clamp 53 is superimposed on the base plate 47 and a spring 54 holds it in engagement with the face of the base plate. The lower transverse flanges of the base plate 47 are provided with a series of vertical projections 56 and the corresponding portion of the clamp 53 is provided with openings 57 corresponding to said projections, this construction providing means for holding the material being tested in addition to the faces of the plates 47 and 53 themselves. To facilitate the manual raising or lifting of the clamp 53 a projection 58 is provided at one end thereof.

The material to be tested, and designated 59 (Fig. 1), is placed upon the base plate 47, between it and the clamp 53, the projections 56 being forced through the material to securely hold the same in place. If desired, a piece of paper 60 may be placed between the material 59 and the clamp plate 53 to protect the material.

As each impression is made the platen is rotated by means of a link 61 to advance the paper for the next impression. This link is eccentrically mounted at one end on the shaft 5 and is provided at the other end with a pawl 62, this pawl engaging a ratchet 63 on the platen. The link 61 is held in engagement with the ratchet by a spring 65. As the shaft 5 is rotated the link 61 is reciprocated to advance or intermittently rotate the platen. The platen may be turned by hand, when threading the paper through the machine, by means of a knurled knob 64.

The operation of the device is as follows: The handle 6 of the machine is rotated to bring the dwell 13 on the cam 7 into engagement with the rear ends of the type bars 8 to raise the type out of engagement with the platen 36. The dwell 13 on the cam holds the bars in this position. The clamp 53 may then be raised and a piece of the carbon paper or other material to be tested is inserted on top of the base plate 47, and, if desired, a piece of paper or other suitable material placed on top of the material being tested. The clamp is then allowed to come down under tension of the spring 54 to hold the material 59 against movement.

The paper from the roll 27 is then threaded through the machine as hereinbefore described. The handle 6 is then operated, causing the cam 7 to vibrate the type bars 8. As the keys strike the paper an impression is made. Each time the type bars are lifted the link 61 operates to rotate the platen part of a revolution, thereby advancing the paper for the next impression. With each revolution of the handle this operation is repeated and as many impressions as desired may be made or the operation may be continued until the material being tested will make no more impressions.

While we have described a specific embodiment of our invention, it is to be understood that changes may be made in the details therein within the spirit and scope of the invention.

What we claim is:

1. In a machine of the class described, the combination of a platen, a plurality of pivotally mounted type bars adapted to cooperate with said platen, a pivotally mounted tensioning lever for each bar, springs severally connecting each of said levers to each of said type bars, means for individually adjusting said tensioning levers to vary the individual tension of each of said springs, and means for moving said levers collectively to correspondingly vary the tension of all of said springs.

2. In a machine of the class described the combination of a platen, a plurality of pivoted type bars adapted to co-operate with said platen, a plurality of pivoted tensioning levers below said bars, means resiliently connecting one end of each lever to a corresponding bar, a pivotally mounted plate below said tensioning levers, the other end of each of said tensioning levers resting upon said plate, and means for raising and lowering said plate to raise and lower the tensioning levers to thereby regulate the tension of the type bars.

3. In a machine of the class described the combination of a platen, a plurality of pivoted type bars adapted to co-operate with said platen, a plurality of rocking tensioning levers located below said bars and resiliently secured thereto, a pivotally mounted plate below said tensioning levers, one end of each of said levers resting upon said plate, means for tilting said tensioning levers individually to adjust the tension on the type bars and means for tilting said plate to collectively tilt said tensioning levers to collectively adjust the tension of the type bars.

4. In a machine of the class described the combination of a platen, a plurality of type bars co-operating therewith, a shaft on which said bars are pivotally mounted, a plurality of tensioning levers, a shaft below and parallel with said first mentioned shaft and pivotally carrying said tensioning levers, springs for connecting said tensioning levers to said bars, means secured to said levers for individually adjusting the tension of said connecting springs and means pivotally mounted on the second named shaft for collectively adjusting the tension of said springs.

5. In a testing machine the combination of a paper-containing compartment having a cover hinged at one end thereof and being provided with a slot at the other end through which the paper may be withdrawn from the compartment, a platen around which the paper is guided, a resiliently mounted presser roller carried by said cover for maintaining said paper in engagement with said platen and a cutter carried by said cover for severing the paper after it passes under said presser roller.

6. In a testing machine the combination of a paper-containing compartment, a cover for said compartment one edge of which is spaced from the front wall of the compartment to provide a slot through which the paper may be withdrawn, a platen adjacent said slot, means for guiding the paper around said platen as it emerges from the compartment, means for guiding the paper to the cover of the compartment as it leaves the compartment, and a paper cutter carried by the cover for severing the paper.

7. In a machine of the class described the combination of a casing, a platen therein, a plurality of type bars pivotally mounted in said casing and adapted to cooperate with said platen, a holder for material to be tested located between said bars and said platen and secured to said casing, a paper-containing chamber having a slot in one wall thereof through which the paper may be withdrawn, and means for guiding said paper around said platen as it emerges from said chamber to be engaged by the material.

8. In a testing machine the combination of a casing, a platen rotatably mounted therein, a plurality of type bars pivotally mounted on said casing and adapted to co-operate with said platen, a holder for the material being tested located between said platen and said type bars, a paper-containing compartment, means for guiding the paper from said compartment around said platen and between said platen and said material being tested, means for oscillating said bars to cause them to strike the material being tested to make an impression on the said paper, and means for turning said platen to advance the paper for the next impression.

9. In a testing machine the combination of a casing, a platen rotatably mounted therein, a plurality of type bars pivotally mounted in said casing and adapted to co-operate with said platen, a holder for the material being tested comprising a base plate and a hinged clamp under tension, said holder being located over said platen beneath said bars, a paper-containing compartment, means for guiding paper from said compartment around said platen and beneath the material being tested, a cam rotatably mounted in said casing and adapted upon rotation to raise said bars out of typing position, means under tension for returning said bars to typing position whereby an impression is made upon said paper, and means for turning said platen to advance the paper for the next impression.

This specification signed by us this 13 day of May 1924.

HAROLD W. A. DIXON.
LEWIS M. DIXON.